(12) United States Patent
Edwards

(10) Patent No.: US 12,517,634 B2
(45) Date of Patent: Jan. 6, 2026

(54) SYSTEM FOR SYNTHESIZING PARALLAX CUES FOR OBJECTS OF INTEREST IN EXTENDED REALITY STREAMING

(71) Applicant: Adeia Guides Inc., San Jose, CA (US)

(72) Inventor: Warren Keith Edwards, Atlanta, GA (US)

(73) Assignee: Adeia Guides Inc., San Jose, CA (US)

( * ) Notice: Subject to any disclaimer, the term of this patent is extended or adjusted under 35 U.S.C. 154(b) by 219 days.

(21) Appl. No.: 18/228,162

(22) Filed: Jul. 31, 2023

(65) Prior Publication Data

US 2025/0044919 A1 Feb. 6, 2025

(51) Int. Cl.
*G06F 3/04842* (2022.01)
*G06F 3/01* (2006.01)
*G06F 3/04815* (2022.01)
*G06T 19/00* (2011.01)

(52) U.S. Cl.
CPC .......... *G06F 3/04842* (2013.01); *G06F 3/013* (2013.01); *G06F 3/017* (2013.01); *G06F 3/04815* (2013.01); *G06T 19/00* (2013.01); *G06T 2200/24* (2013.01)

(58) Field of Classification Search
CPC ...... G06F 3/04842; G06F 3/013; G06F 3/017; G06F 3/04815; G06F 3/011; G06T 19/00; G06T 2200/24
See application file for complete search history.

(56) References Cited

U.S. PATENT DOCUMENTS

| 10,701,318 | B2 | 6/2020 | Valli | |
|---|---|---|---|---|
| 2014/0347391 | A1* | 11/2014 | Keane | G06F 3/0487 345/633 |
| 2015/0212576 | A1* | 7/2015 | Ambrus | G06F 3/0482 345/156 |
| 2018/0075655 | A1* | 3/2018 | Cabanier | G06T 3/40 |

(Continued)

FOREIGN PATENT DOCUMENTS

WO  2018075968 A1  4/2018

OTHER PUBLICATIONS

Breen, D. E., et al., "Interactive Occlusion and Collision of Real and Virtual Objects in Augmented Reality," ECRC, 1-25 (1995).

(Continued)

*Primary Examiner* — Phuong H Nguyen
(74) *Attorney, Agent, or Firm* — HALEY GUILIANO LLP

(57) ABSTRACT

The present application provides for synthesizing parallax cues for objects of interest in XR environments. An XR application may be applied to a user interface (UI) that generates an XR environment having several rendered objects. This environment may be an AR overlay, on a real-world environment, where there may be a mountain, a tiger, a deer, and a jeep. The XR application receives a selection of an object, e.g., the tiger, by receiving an eye gaze vector positioned at the tiger for an extended period. The XR application may then detect movement from the UI. Capturing movement from an AR headset may be detected after locking onto the tiger object. The XR application may then adjust the display of the XR environment, based on the movement, to exaggerate the parallax shift of the object of interest (e.g., the tiger) and not exaggerate the parallax shift of the other object (e.g., the jeep).

20 Claims, 16 Drawing Sheets

(56) References Cited

U.S. PATENT DOCUMENTS

2020/0211283 A1* 7/2020 Krauthamer .......... G06T 19/006
2024/0248527 A1* 7/2024 Strawn ................. H04N 13/383

OTHER PUBLICATIONS

Tang, X., et al., "GrabAR: Occlusion-aware Grabbing Virtual Objects in AR," Proceedings of the 33rd Annual ACM Symposium on User Interface Software and Technology, 697-708 (2020).
Kumar, P., "Occlusion is important in AR," Selerio, 1-10 (2018).

* cited by examiner

SYSTEM FOR SYNTHESIZING PARALLAX CUES FOR OBJECTS OF INTEREST IN EXTENDED REALITY STREAMING

BACKGROUND

This disclosure is directed to systems and methods for visual selection of one or more objects in extended-reality (XR) streaming.

SUMMARY

In complex XR environments, objects are often occluded; for example, some objects of interest may be obscured behind other objects. In the real world, for nearby objects, one of the chief ways to mitigate this scenario is by using parallax cues. For example, the viewer may shift their head to alter the perception of objects at different distances. This is one of the chief cues that humans use for depth perception, as well as a natural physical interaction for revealing occluded objects. In the real world, this head movement shifting from side to side is typically used to see objects that might be obscured, as well as to gain a better sense of their relative depth.

In the real world, however, parallax shift falls off with distance. A viewer's ability to change the relative perception of two objects via a parallax shift is greater for nearby objects, and lesser (or even virtually non-existent) for more distant objects. Parallax techniques have drawbacks such as for distant objects, where parallax shift cannot be used to ascertain relative depth, due to the very slight effects of parallax at that distance. Moreover, the normal parallax technique using a natural human head motion cannot be used to reveal occluded objects at a distance, as the normal parallax shift between relative objects at distance is minimal and imperceptible to the human eye. The magnitude of the effect of a parallax shift is based on the distance from the viewer to the objects being viewed: nearby objects appear to shift rapidly as we change position, while distant objects shift little if at all. Thus, even if this parallax effect were to be ported into an XR environment, the same drawbacks would exist.

In one approach, in an XR environment, the parallax effect may be exaggerated for one or more objects. For example, if one or more objects are obscured behind an obstruction (e.g., a tree and a horse are obscured behind a barn), an XR operation may exaggerate the parallax effect of the tree and the horse such that these objects are more visible upon a recognition that XR hardware has performed a movement to determine what is behind the barn. However, the apparent problem with this approach is how to select, within the user interface (UI), the object or objects for which to exaggerate parallax shift. Without requisite accuracy and precision to select only objects of interest, merely exaggerating the parallax of objects does not fully form a solution to easily select one or more objects of interest, via a UI, that may be obscured. In such an approach, parallax shift may be exaggerated for all objects displayed by the XR equipment. This approach has a problem of shifting too many objects too rapidly, causing poor user experience. Moreover, some objects may be moved completely out of the display area due to excessive parallax. Accordingly, a need exists for a UI that exaggerates parallax in an XR environment only for certain objects of interest (e.g., virtual objects) while parallax shift of other objects is not exaggerated.

To help address these problems, systems and methods are provided herein for synthesizing parallax cues for objects of interest in XR environments. An XR application may be applied to a UI that may detect an intentional trigger, or locking, of an object from XR hardware to determine an object of interest on which to perform an exaggerated parallax shift. This provides for a navigation-efficient UI that intentionally exaggerates the parallax shift of a rendered object of interest to view the occluded object more easily, as well as reveal more detail about the relative depth ordering of objects at a distance.

In some examples, the present disclosure provides for an XR application that may generate an XR environment having several rendered objects. For example, this environment may be an AR overlay, on a real-world environment, where there may be a mountain, a tiger, a deer, and a jeep (e.g., each being a virtual object generated by the XR application). The XR application receives a selection of one of the objects, by, for example, a user's eye gaze vector positioned or directed at the tiger for an extended (e.g., larger than threshold, such as 2 second threshold) period. In some embodiments, the XR application then detects movement from the UI. For example, head movement from an AR headset is detected after locking on the tiger object. The XR application then adjusts the display of the XR environment to exaggerate the parallax shift of the object of interest (e.g., the tiger) based on the head movement, and it does not exaggerate the parallax shift of another object (e.g., the jeep). By receiving a specific selection of objects via the UI, the XR application can apply specific augmentation (i.e., exaggerated parallax shift) to only those objects. In some embodiments, another object that is not selected may have a parallax shift, but not an exaggerated parallax shift of the selected object. Using the above example, the selected tiger object has an exaggerated parallax shift applied, but the non-selected jeep object has a normal parallax shift applied.

Ways for the XR application to determine a selection to "lock" a rendered object for exaggerated parallax shift include gesture input, eye gaze tracking input, voice command input, typed input, or an input defining a selection of an area of the XR environment instead of an object. More specifically, in some aspects of this disclosure, the XR application may determine an eye gaze vector in the XR environment based on a user's eye position. If one or more objects intersect the eye gaze vector, the XR application may confirm the selection of the intersecting objects. In other aspects of this disclosure, a wink gesture may be received and a direction of an eye gaze vector proximate to or directed to a virtual object may be identified. In this way, a "wink to lock" type of selection mechanism may be implemented in the XR application. In some embodiments, the XR application monitors how long an eye gaze vector is focused on a particular position. If the eye gaze vector exceeds a temporal threshold that exceeds a normal reading focus time, a selection is confirmed. This is done to avoid classification of reading text as indicating an object of interest. Time needed to read text is typically shorter (e.g., typical reading saccade is 20-40 ms) than the time needed to secure a lock on an object. In yet other aspects of this disclosure, a spatial area selection containing the virtual object (e.g., a rectangle drawn with the user's finger over a tiger object) within the XR environment may be received by the XR application to confirm a selection.

In some embodiments, the XR application, upon receiving a UI selection of a virtual object (e.g., tiger), may also receive a fixing input which allows for the object to be fixed at a particular position (e.g., the tiger is placed at an exaggerated position from its original position). Then, upon receiving a UI movement input (e.g., an AR headset moves to see objects behind a mountain), the tiger object remains fixed, while the other virtual objects have exaggerated parallax shifts applied. In this way, the tiger, which is an object of interest, is fixed at a position designated by the fixing input.

In some embodiments, when the display of the XR environment is adjusted to provide exaggerated parallax on one or more objects, the XR application may generate phantom outlines of the virtual objects at a location prior to the exaggerated parallax shift of the selected first virtual object. This provides a reference position of where the virtual object was originally, prior to the exaggerated parallax shift.

Accordingly, the present disclosure provides for an improved navigational XR UI with intentional exaggerated parallax shifting of rendered objects to view occluded objects more easily, based on an intentional selection.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
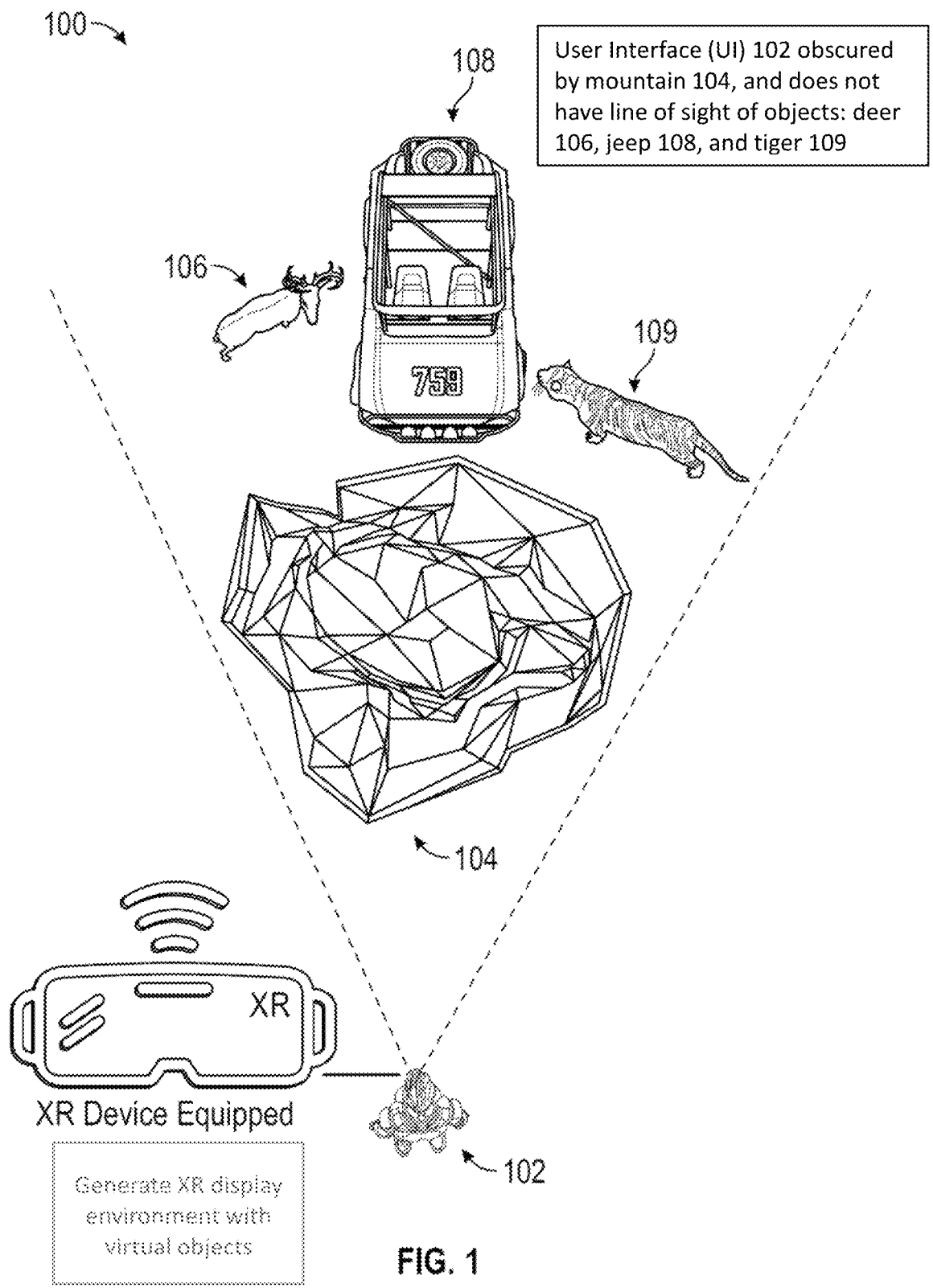
FIG. 1 shows an illustrative scenario in which a UI on an XR device locks an object and performs an exaggerated parallax shift on the locked object, in accordance with some embodiments of this disclosure.
Figure 1:
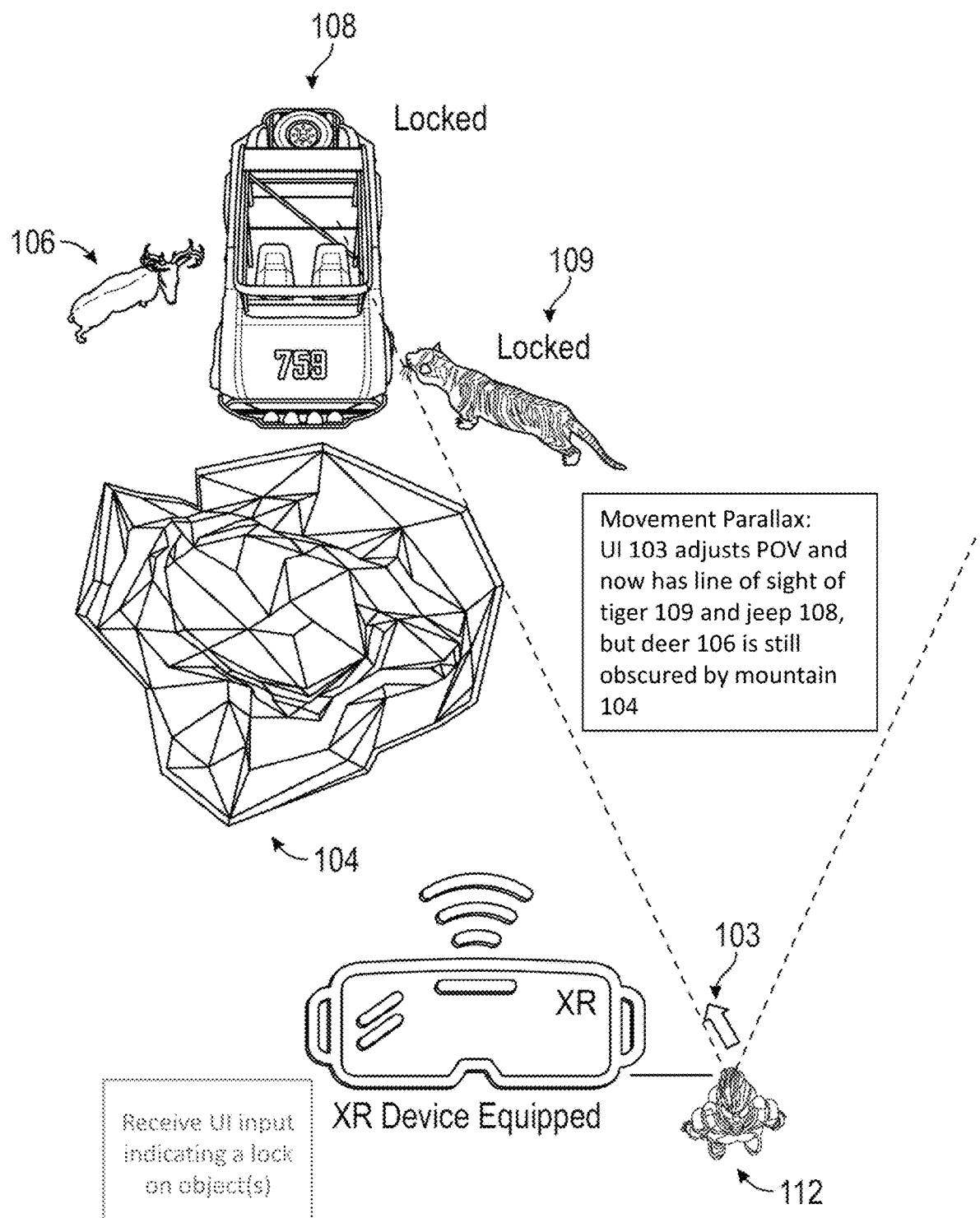
Figure 1:
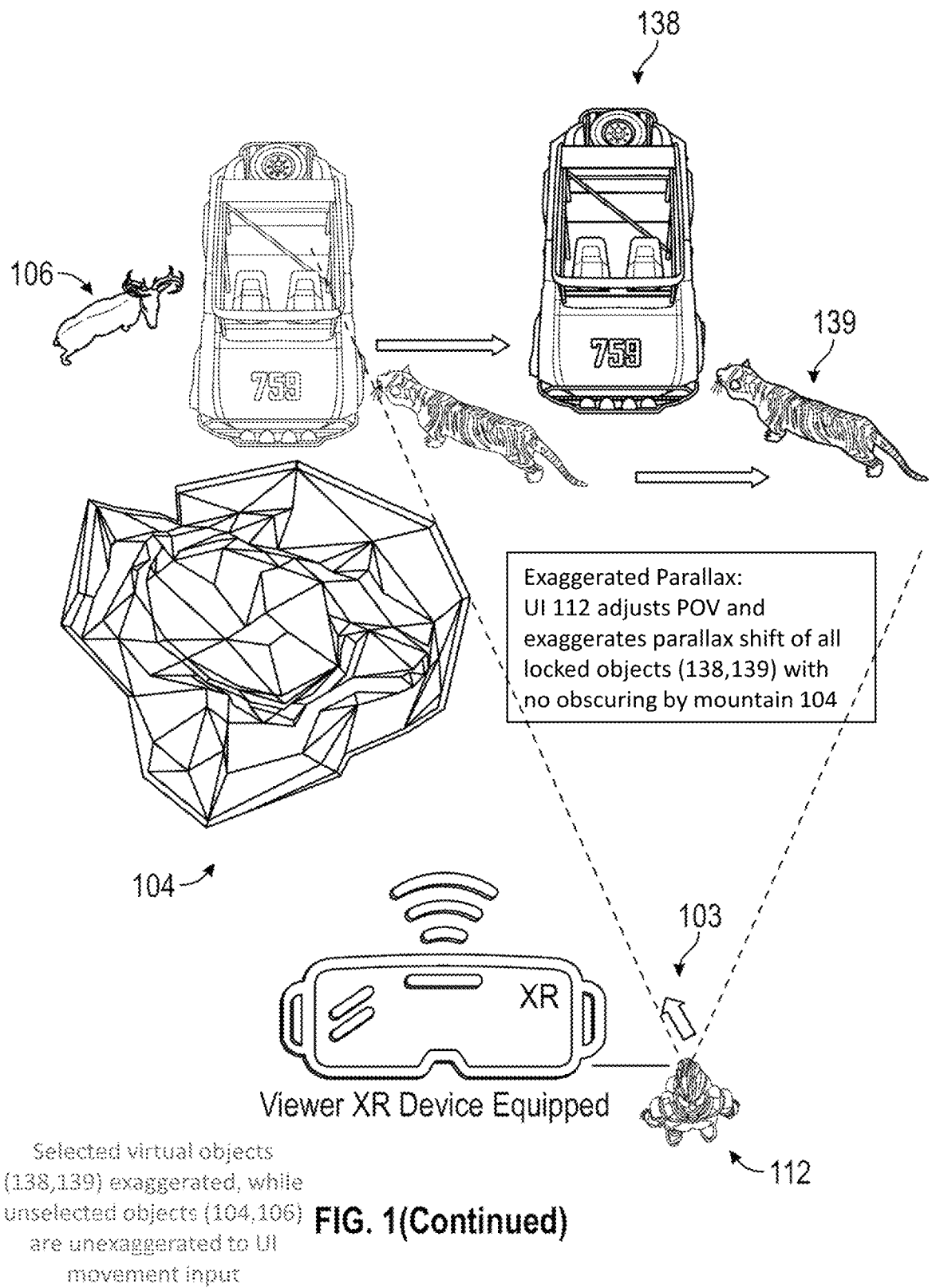
Figure 1:
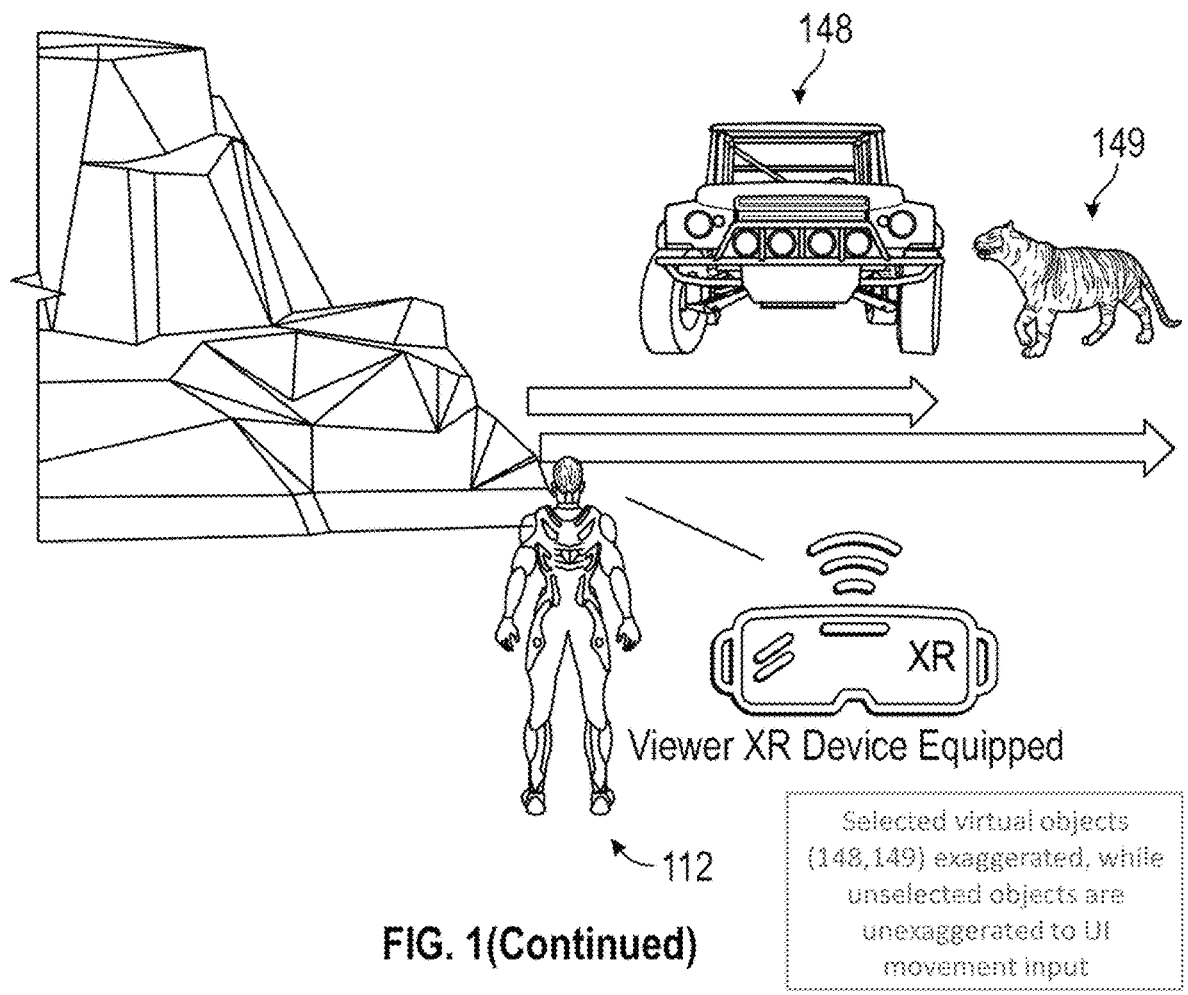

FIG. 1 shows an illustrative scenario 100 in which a UI of an XR device locks an object (e.g., a VR or AR object) and performs an exaggerated parallax shift on the locked object, in accordance with some embodiments of this disclosure. An XR device, such as an AR headset, may be used in a real-world environment and provide an AR overlay UI 102. In this example, the point of view (POV) of the UI on the XR device provides for viewing of a mountain 104. The mountain occludes many other objects including a deer 106, a jeep 108, and a tiger 109. Generally, in AR applications, a 3D environment overlay is modelled from the real-world environment. As the XR device shifts in position, the POV of the UI for the overlay moves proportionally.

In some embodiments, the XR device runs an XR application that creates and renders the XR environment. The XR application may be any combination of hardware and software to create the XR environment. In the present example, the AR headset has local hardware that runs an operating system. The operating system provides the XR application to interface with the local hardware. In the present example, the XR application creates an XR overlay of the real-world environment by generating virtual objects from detected real world objects. In some embodiments, the XR application generates for display an XR environment having a first virtual object (e.g., tiger 109) and a second virtual object (e.g., jeep 108). This can be performed using one or more computer vision techniques for object detection from a real-world environment and using known rendering techniques to create an XR virtual object associated with the real-world object.

The XR device changes position 112 and alters its POV 103 of the UI. At this position the UI's POV 103 has sight of the tiger 109 and the jeep 108. However, deer 106 is still occluded by the jeep and mountain. In some embodiments, the XR application receives a UI selection input indicating a selection of the first virtual object (e.g., tiger 109). There may be a multitude of techniques implemented to receive selection input indicating the selection of the first virtual object. For example, the XR application may implement any combination of gesture input, eye gaze tracking input, voice command input, typed input, or an input defining a selection of an area of the XR environment, rather than an object.

In some embodiments, the XR application, upon the indicated selection of the first virtual object, augments the first virtual object in a manner to distinguish this virtual object from non-selected virtual objects. For example, the XR application may augment the first virtual object by adding lighting effects to the selected object, such as a halo that adds lighting to the perimeter of the virtual object, to provide a visual distinction of the selected virtual object from non-selected virtual objects. Any suitable manner of visual augmentation may be applied including movement-based scripts (e.g., the virtual object hops, or shakes, or pans to enlarge before returning back to its normal size).

Figure 2:
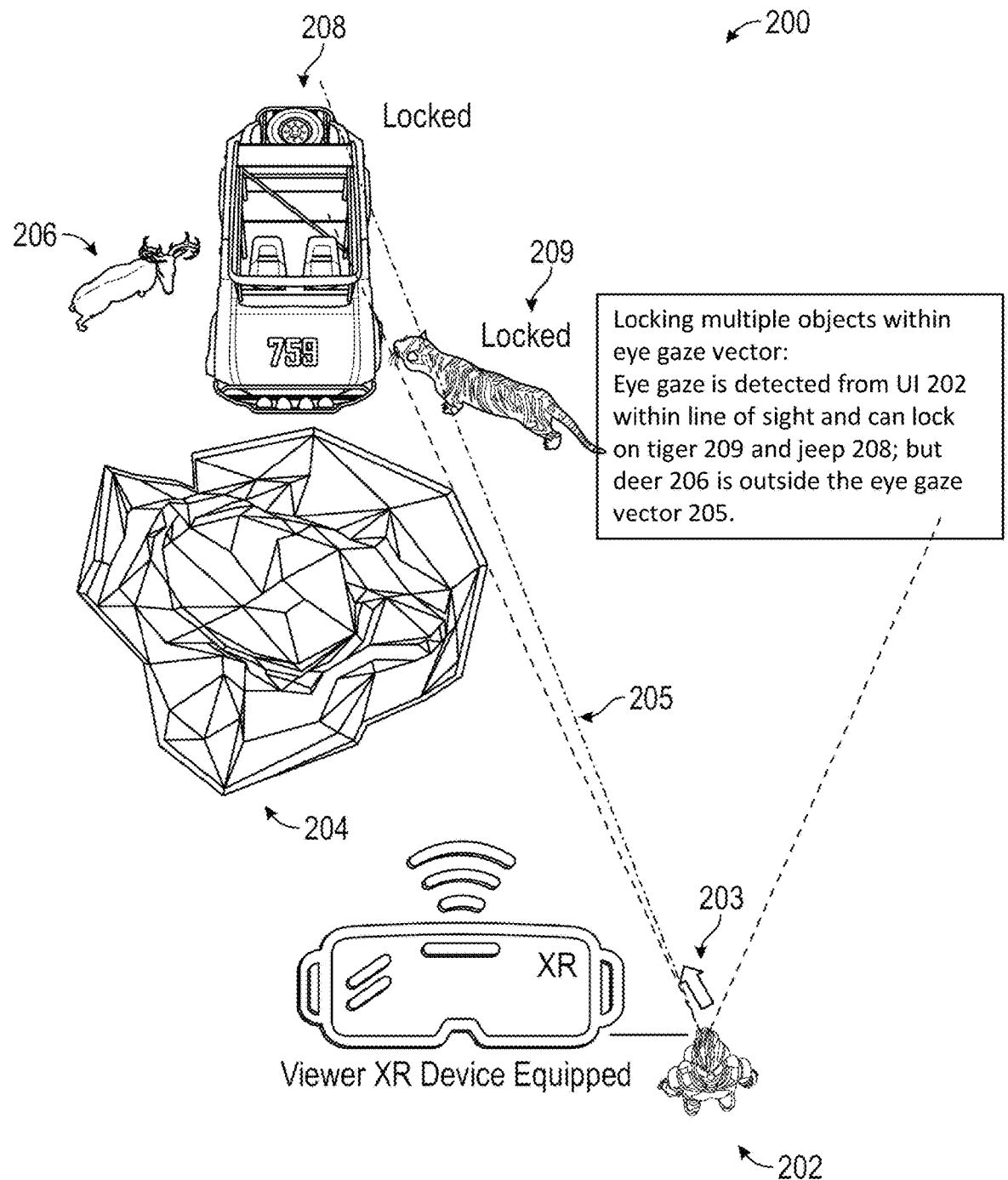
FIG. 2 shows an illustrative scenario in which a UI on an XR device receives an eye gaze vector to lock one or more objects in an XR environment, in accordance with some embodiments of this disclosure.

Returning to receiving the UI selection input, in some embodiments, the XR application determines an eye gaze vector in the XR environment, wherein the eye gaze vector is based on a user's eye position. The eye gaze vector may be any form of mathematical expression for a 3D position (e.g., cartesian coordinates of x,y,z) and may include roll, pitch, and yaw having a six-degrees data set per coordinate. For example, in the present example, the XR application receives input from the AR headset of a viewer's eye position. From this data, the XR application determines the specific eye gaze vector in the corresponding real-world environment with which the viewer is focusing their visual attention. In some embodiments, the XR application determines whether at least one of the first virtual object or the second virtual object intersects the eye gaze vector. FIG. 2 shows an illustrative scenario 200 in which a UI on an XR device receives an eye gaze vector to lock one or more objects in an XR environment, in accordance with some embodiments of this disclosure. In this example, an AR headset device having a UI 202 is running an XR application that detects the AR headset device movement 203, altering the POV to include the tiger 209 and jeep 208. The POV is outside of the objects mountain 204 and deer 206. The XR application determines an eye gaze vector 205. The XR application further determines that the eye gaze vector intersects with the tiger and the jeep. This confirmatory intersection of the eye gaze vector and the tiger and jeep locks these objects confirming a selection of these objects.

In some embodiments, the XR application receives a gesture-based input to indicate selection of first virtual object. For example, the XR application detects and receives a wink gesture to detect selection of the first visual object (for example, the XR application detects using camera input that the viewer of the AR headset winked). A wink may be a preconfigured gesture on the XR application to indicate selection of a first virtual object. In some embodiments, the XR application identifies that the eye gaze is positioned or directed proximate to the first virtual object during the wink gesture. For example, the XR application determines that the eye gaze direction is within the vicinity of the tiger at the time of a wink gesture. In response, the XR application select the tiger as the selected or locked virtual object.

In some embodiments, the XR application uses eye gaze vectors that intersect with virtual objects to determine selection. However, at times, a viewer using an XR device may be merely reading text in the real or virtual world, and these eye gazes are not intentional to indicate selection. In some embodiments, the XR application receives an eye gaze proximate to the first virtual object. The XR application determines whether movement of the eye gaze exceeds a reading avoidance temporal threshold, the temporal threshold being configured on a specific set of temporal parameters (e.g., certain amount of milliseconds). Sustained reading is associated with eye motion patterns in which alternating periods of saccades (short, rapid eye movements) and fixation (short stops) occur in fairly regular patterns over a line of text. During reading, each saccade lasts on the order of 20-40 ms, and each fixation lasts on average 200-250 ms, with the eyes jumping and skipping over the text at around 7-9 characters (average) per saccade. Most saccades are within the range of 20 degrees of visual angle (at most) before the eye returns to a roughly previous position. This is a highly idiosyncratic motion that can be detected by the XR application. Thus, the XR application, in response to the eye gaze exceeding the reading avoidance temporal threshold, confirms the selection of the first virtual object. In this manner, the XR application can avoid capturing unintentional selections when the user of a XR headset is merely reading text instead of intentionally confirming a selection.

In some embodiments, the XR application, when receiving the UI input indicating the selection of the first virtual object, receives an eye gaze vector that is fixated on an object for a locking threshold. If the XR application determines that the locking threshold is exceeded, the XR application confirms the locking of the virtual object that intersects the eye gaze vector. In some embodiments, the locking threshold is 1-2 seconds.

Returning to FIG. 1, the XR application has now received input selecting the tiger 109 and the jeep 108 virtual objects. In some embodiments, the XR application may, in response to receiving a UI movement input, adjust the display of the XR environment such that a parallax shift of the selected virtual object (or objects is exaggerated in proportion to the UI movement input. The parallax shift of the unselected object (or objects) is unexaggerated in proportion to the UI movement input. In some embodiments, the parallax shift of the unselected object (or objects) is normal, i.e., the parallax shift as it normally would be due to movement of the POV. In another embodiment, the parallax shift of the unselected object (or objects) is still exaggerated but not as much as for the selected virtual object or objects. For example, parallax shift of selected objects may be exaggerated by 100% (i.e., objects shifts as if the movement was twice as great in magnitude), while parallax shift of un-selected is only exaggerated by 50% (i.e., objects shifts as if the movement was 1.5 times as great in magnitude).

For example, in response to the XR application detecting the AR headset moving 112, the XR application performs an exaggerated parallax shift for the selected virtual objects jeep 138 and tiger 139 virtual objects. The exaggerated parallax shift may be in proportion to the UI movement input. For example, if the UI movement input is slight, the exaggerated parallax shift may be proportional to the UI movement input with predefined multiplier (or multipliers). For example, a turn of 15 degrees from original position may provide an exaggerated parallax shift of a 3× multiplier, but a turn of 30 degrees from original position may provide an exaggerated parallax shift of a 6× multiplier. In some embodiments, the XR application renders all parallax shifts in real time, and thus if the UI movement changes, the magnitude of the exaggerated parallax shift changes in proportion to the shift. Seen from a different viewpoint, the jeep 148 and tiger 149 can be seen to have exaggerated parallax shifts. In some embodiments, the XR application determines if other virtual objects would occlude the exaggerated parallax shift of the selected or locked virtual object(s). In response to a determination that an obstructing virtual object occludes the exaggerated parallax shift of the first virtual object, the XR application adjusts the exaggerated parallax shift of a selected virtual object to be visible outside of the occlusion of the obstructing virtual object.

In some embodiments, the exaggerated parallax shift is performed along the same axis of movement as the received UI movement for the XR device. In this embodiment, the effect is that when the user wearing an XR device shifts their head, either horizontally or vertically, distant objects are repositioned along the axis of movement to indicate their relative stacking order and to reveal any occluded objects in the field of view. In this embodiment, the repositioning of the virtual objects is dynamic. In some embodiments, the XR application repositions the virtual objects based on data retrieved from a scene graph providing positional information for a plurality of virtual objects within the XR environment. In other embodiments, the XR application repositions the virtual objects based on one or more anchor points (including relative coordinate positions of the virtual objects) within the XR environment. In some embodiments, the XR application performs the exaggerated parallax shift using variable transform matrixes that take 3D coordinates from the initial position of the virtual object and transform them to a second position based on the exaggerated parallax shift. The specific magnitude of the shift may be determined based on at least one mathematical model using a Jacobian matrix, for instance, or any other suitable technique for adjusting bitmap or vector graphics based on POV shift.

Once the XR application exaggerates the parallax shift of a selected object(s), the virtual object(s) may be deselected by the XR application in response to receiving a deselection cue. In some embodiments, the de-selection cue includes an eye gaze vector that intersects with an object that excludes the first virtual object. For example, a user with an AR headset may orient their view to simply look at other areas of the XR environment to disengage locking. In some embodiments, this deselection may return the virtual objects to their original position based on the normal geometry of the scene prior to any parallax shifting. In other embodiments, the deselection cue may be any combination of gesture input, eye gaze tracking input, voice command input, typed input, or an input defining a selection of an area of the XR environment.

Figure 3:
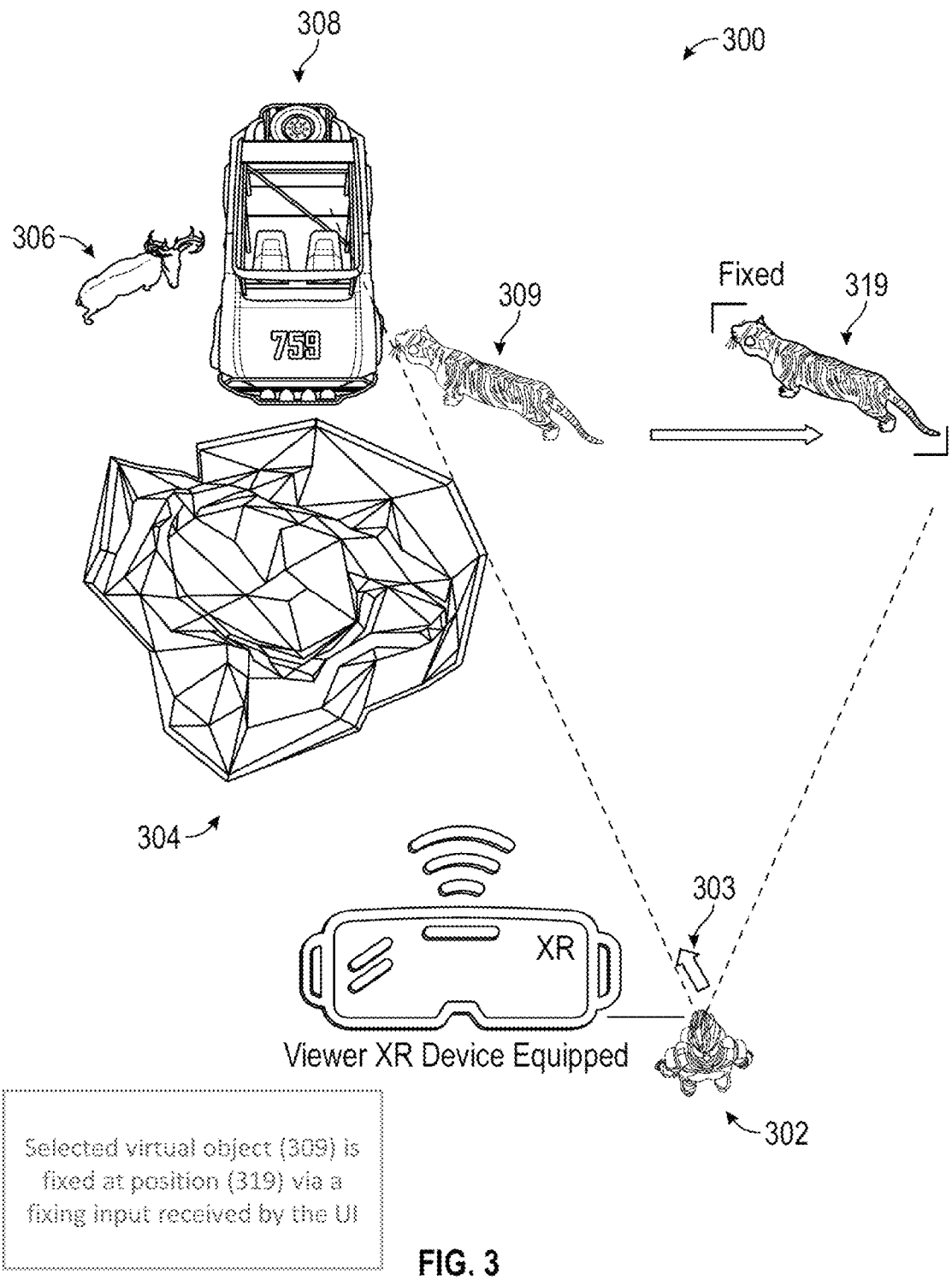
FIG. 3 shows an illustrative scenario in which a UI on an XR device fixes a selected object to a position in an XR environment, in accordance with some embodiments of this disclosure.

FIG. 3 shows an illustrative scenario 300 in which a UI on an XR device fixes a selected object to a position in an XR environment, in accordance with some embodiments of this disclosure. In some embodiments, the XR application receives a UI fixing input to fix the location of a virtual object to a position in the XR environment. In this way, the selected object can maintain a specific fixed position within the virtual environment (e.g., AR overlay). This may be advantageous to allow for user specific aesthetic preferences, and/or user specific organizational preferences. For example, the XR application on XR device 302 selects tiger 309. The POV of the AR headset did not cover mountain 304, jeep 308, and deer 306. In response to receiving additional UI movement input, the XR application may adjust the display of the XR environment where the location of the selected virtual object (e.g., the tiger 309) remains fixed to the position in the XR environment. After receiving the UI movement input 303 where the AR headset turns, the XR application receives a UI fixing input to fix the tiger at position 319. The UI fixing input may be any combination of gesture input, eye gaze tracking input, voice command input, typed input, or an input defining a selection of an area of the XR environment. For example, the XR application receives a voice command with an audible voice note "fix," to fix the virtual object. In some embodiments, XR application may also un-fix an object based on appropriate input.

After the object (e.g., the tiger 309) is fixed, the XR application may perform additional locking and fixing operation for any one of the virtual objects by repeating the step; of locking, unlocking, fixing, an unfixing objects with any amount of POV movement at any point in the process. Taken together, the UI of the XR application allows freedom for the UI inputs to dis-occlude any amount of virtual objects and see such objects from any suitable angle.

In some embodiments, the XR application, while adjusting the display of the XR environment, generates for display a phantom outline of the first virtual object at a location prior to the exaggerated parallax shift of the selected first virtual object. In FIG. 3, the XR application generates a phantom outline of the virtual tiger object at 309. This indicates the original position of the virtual object prior to any exaggerated parallax shift. The exaggerated parallax shift version of the object can be seen at 319. In some embodiments, the phantom outline may be an augmentation applied to the virtual object in the original position. This augmentation may include any combination of opacity manipulation, saturation manipulation, color variation manipulation, transparency manipulation, and/or any other visual manipulation.

Figure 4:
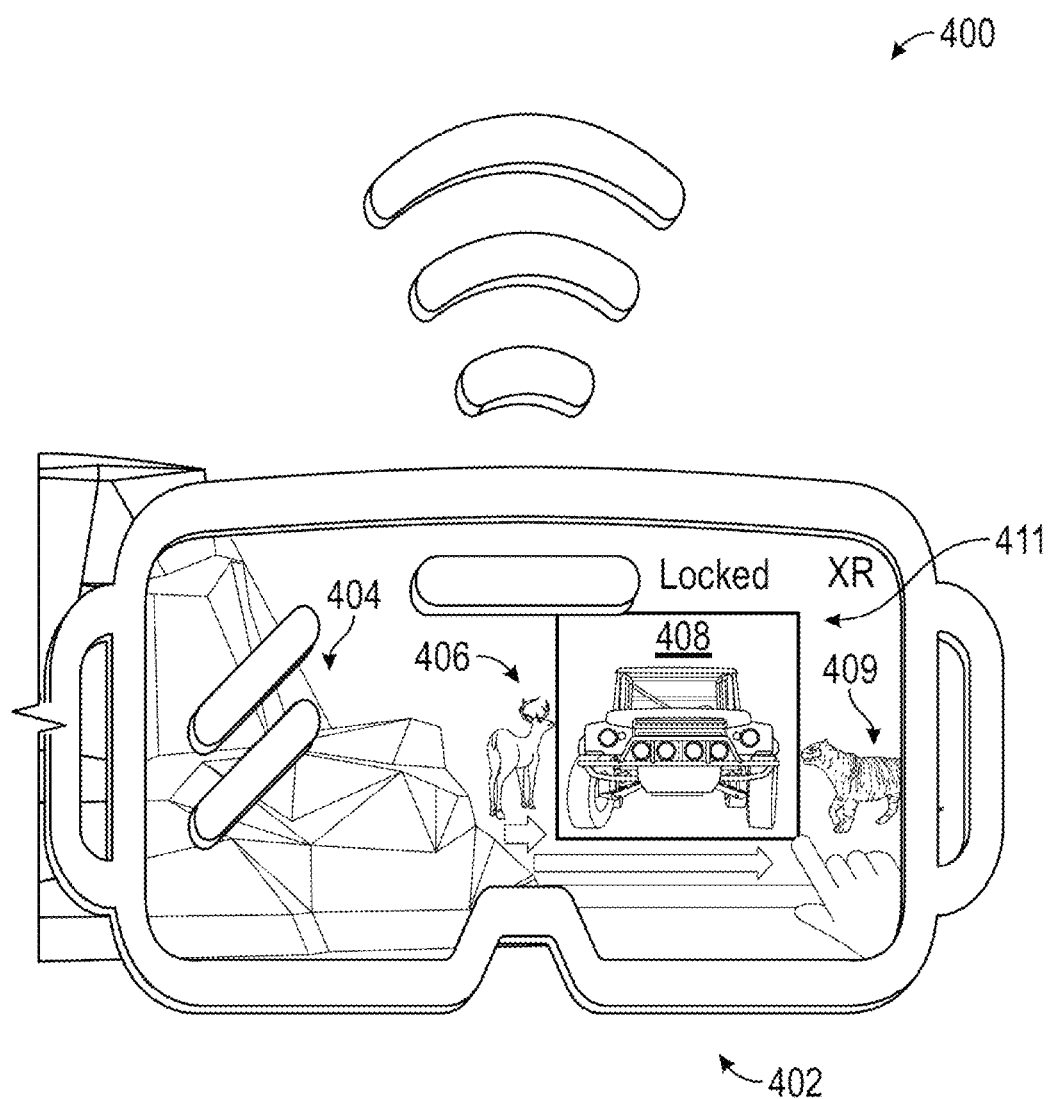
FIG. 4 shows an illustrative scenario in which a UI on an XR device receives a selected object via a gesture in an XR environment, in accordance with some embodiments of this disclosure.

In some embodiments, the XR application, when receiving the UI input indicating the selection of the first virtual object, also receives a spatial area selection via a drawn polygon within the XR environment. FIG. 4 shows an illustrative scenario 400 in which a UI on an XR device receives a selected object via a gesture in an XR environment, in accordance with some embodiments of this disclosure. In this example, the XR application generates a UI 402 on an AR headset that has multiple virtual objects within its POV including mountain 404, deer 406, jeep 408, and tiger 409. In this example, the XR application receives a spatial area selection of the jeep by a gesture input that draws a rectangle 411 over the jeep 408. The XR application determines that a virtual object is contained within the drawn rectangle, namely the jeep, and confirms selection. In some embodiments, the spatial area may be any type of polygon that is overlayed over the XR environment to capture one or more virtual objects.

Figure 5:
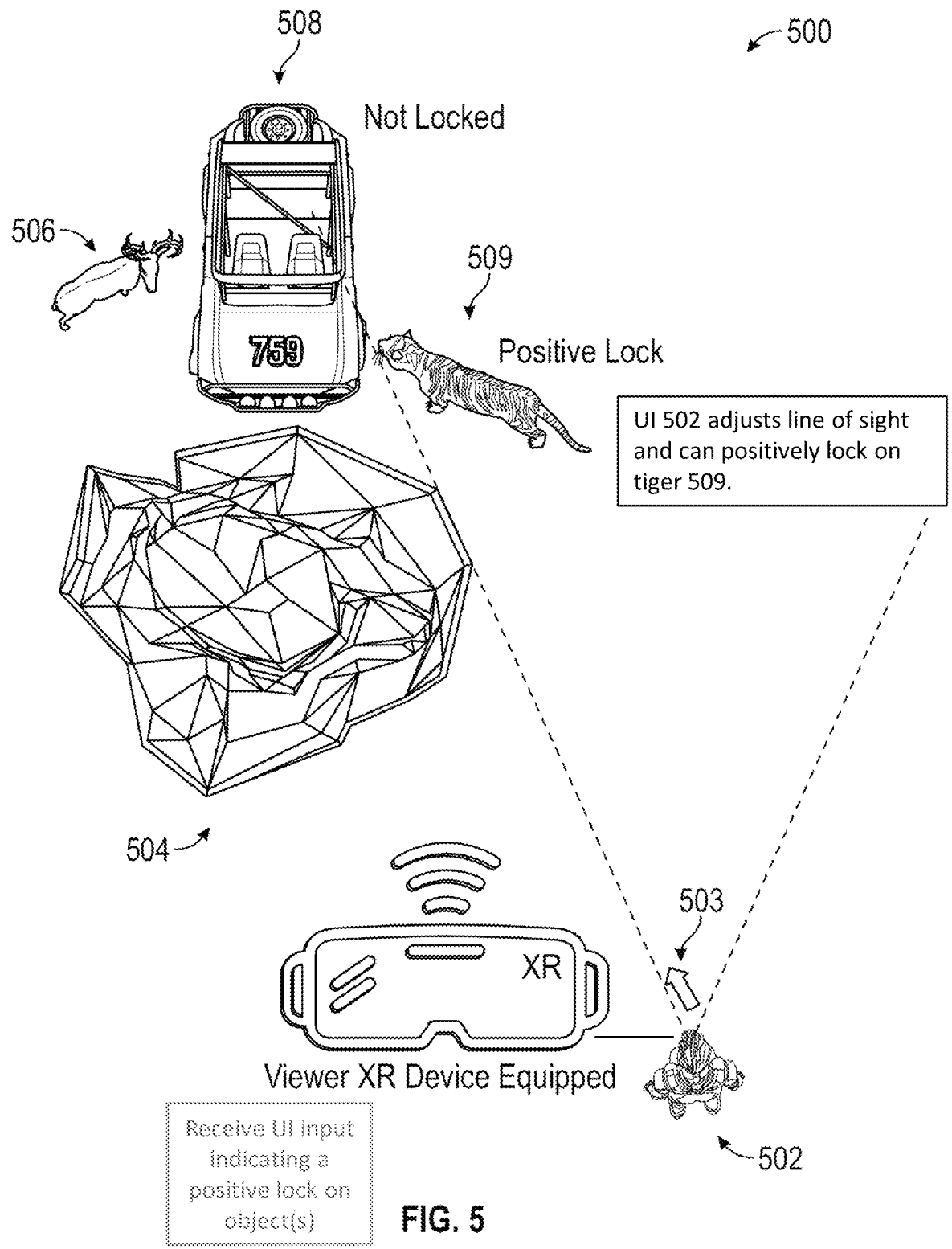
FIG. 5 shows an illustrative scenario in which a UI on an XR device positively locks an object and performs an exaggerated parallax shift on the locked object, in accordance with some embodiments of this disclosure.
Figure 5:
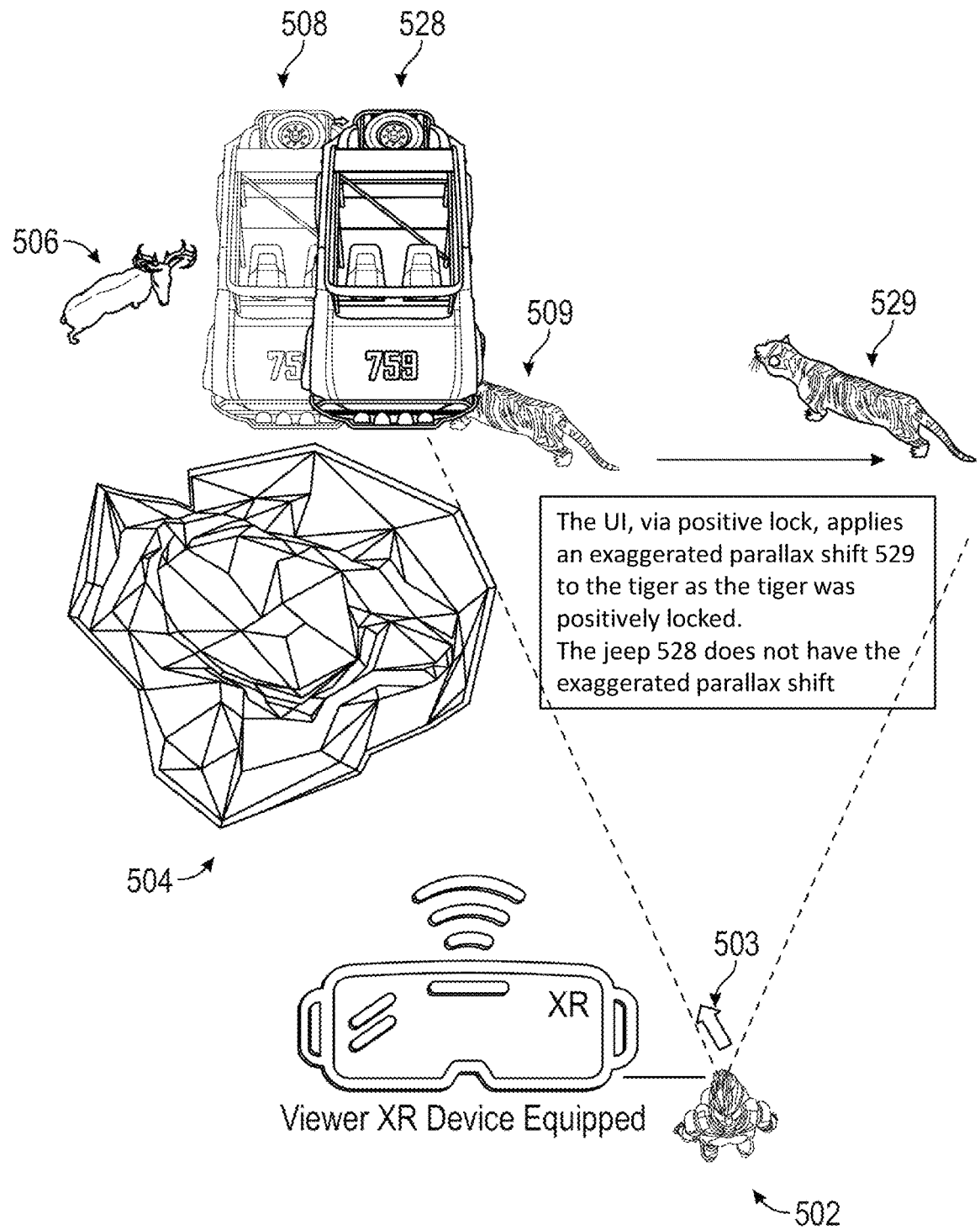

FIG. 5 shows an illustrative scenario 500 in which a UI on an XR device positively locks an object and performs an exaggerated parallax shift on the locked object, in accordance with some embodiments of this disclosure. The XR application implemented on a UI 502 of an AR headset receives a UI movement input 503 and adjusts the POV and selects a first virtual object (e.g., tiger 509). There are other unselected objects within the POV of the XR application. Namely, the jeep 508 is not selected, while other objects out of view (e.g., deer 506 and mountain 504) are also not selected. In this example, a "positive lock" embodiment is exhibited where the selected object is the object for which the exaggerated parallax shift will be applied relative to the other objects. As shown, the exaggerated parallax-shift of the tiger object 529 is significant relative to the unexaggerated parallax shift of the unselected jeep object, which was originally at position 508 and marginally shifted to 528. It should be noted that deer 506 has not been shifted as it is outside the POV of the UI on the XR device.

Figure 6:
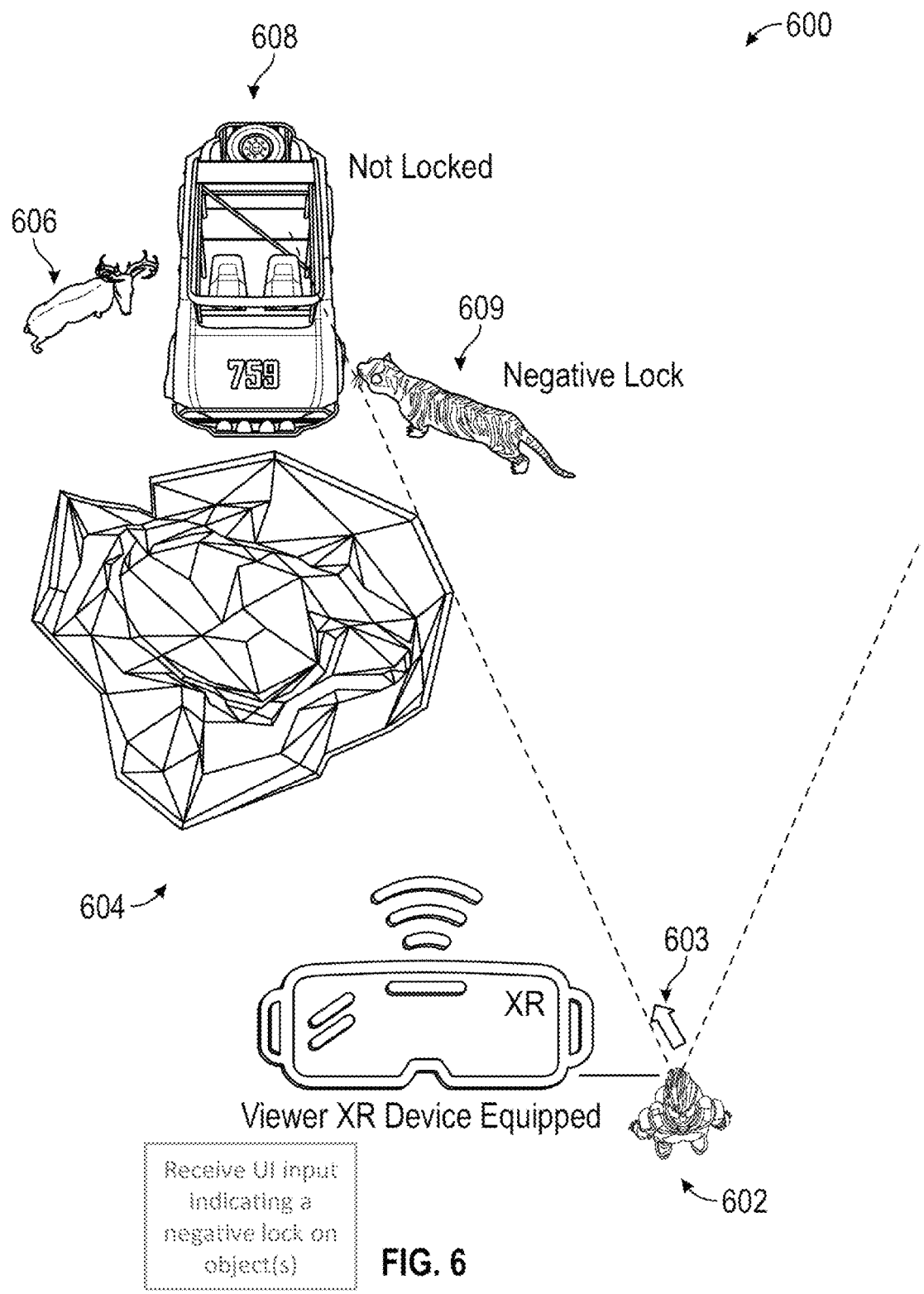
FIG. 6 shows an illustrative scenario in which a UI on an XR device negatively locks an object and performs an exaggerated parallax shift on the non-locked objects, in accordance with some embodiments of this disclosure.
Figure 6:
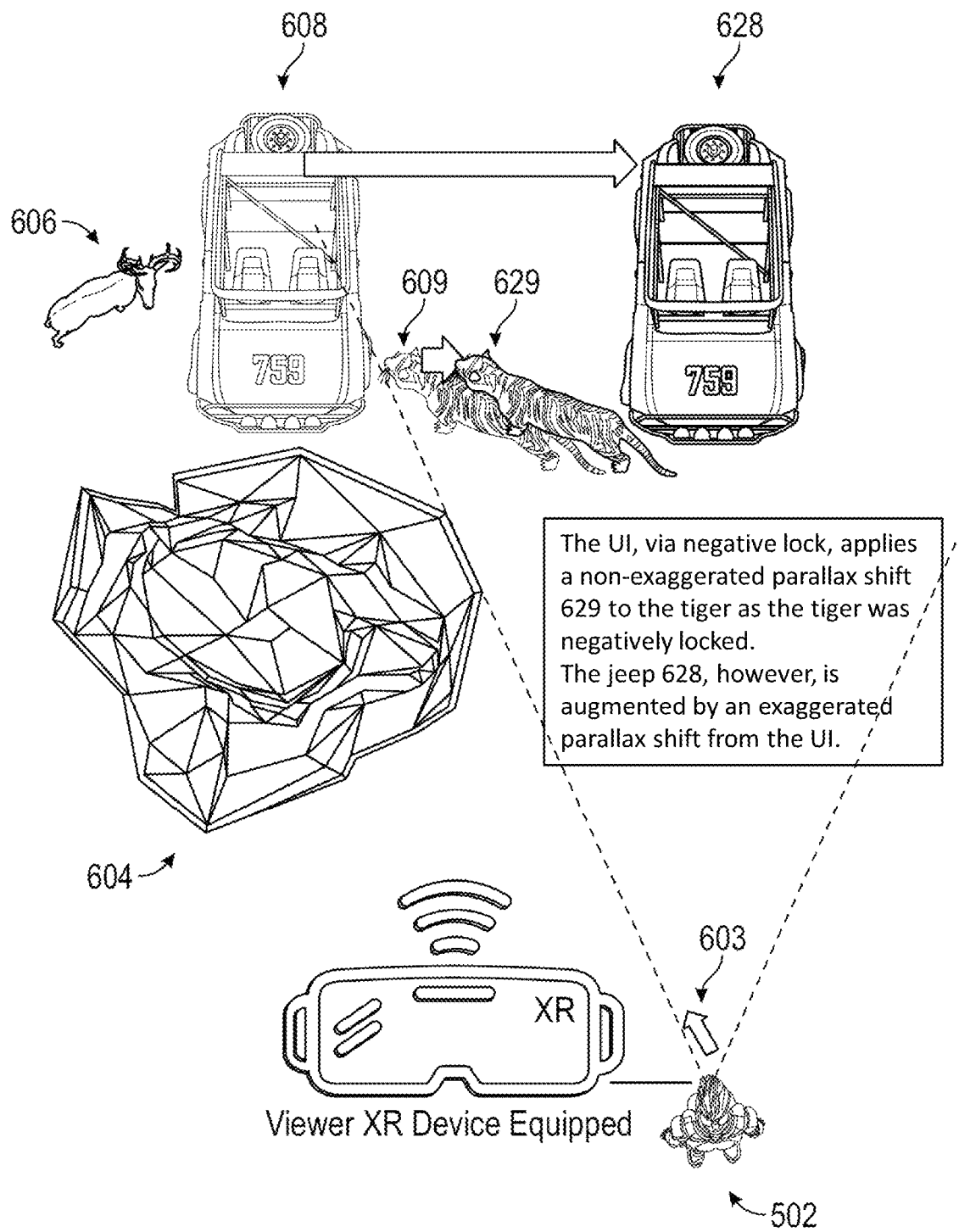

FIG. 6 shows an illustrative scenario 600 in which a UI on an XR device negatively locks an object and performs an exaggerated parallax shift on the non-locked objects, in accordance with some embodiments of this disclosure. The XR application implemented on a UI 602 of an AR headset receives a UI movement input 603, adjusts the POV and selects a first virtual object (e.g., tiger 609). There are other objects within the POV of the UI 602. Namely, the jeep 608 is not selected, while other objects out of view (e.g., deer 606 and mountain 604) are also not selected. In this example, a "negative lock" embodiment is exhibited where the selected object is the object for which the exaggerated parallax shift will not be applied relative to the other objects. Conversely, the exaggerated parallax shift will be applied to all other non-selected virtual objects within the POV. As shown, the exaggerated parallax-shifted tiger object 609 is marginally shifted to 629, while the unselected jeep, which was originally at position 608, has an exaggerated parallax shift to 628. It should be noted that deer 606 has not been shifted as it is outside the POV of the UI on the XR device. Had this example used a "positive lock," the deer would shift with an exaggerated parallax shift. Thus, these embodiments provide for a customizable user experience in XR for enhanced organization and/or aesthetics.

In some embodiments, the XR application may adjust the display of the XR environment such that a parallax shift of a third virtual object is exaggerated in proportion to the UI movement input. This may be when the third virtual object is obscured by the unselected second object. Referring back to FIG. 1, the XR application applies an exaggerated parallax shift to a first virtual object (e.g., the tiger 139). However, the XR application also applies an exaggerated parallax shift to a third virtual object (e.g., the jeep 138). In some embodiments, the third virtual object is exaggerated less than the first virtual object. For example, the exaggerated parallax is presented such that both the first and third virtual objects are presented as exaggerated, however the third virtual object is presented as less exaggerated than the first virtual object.

Figure 7:
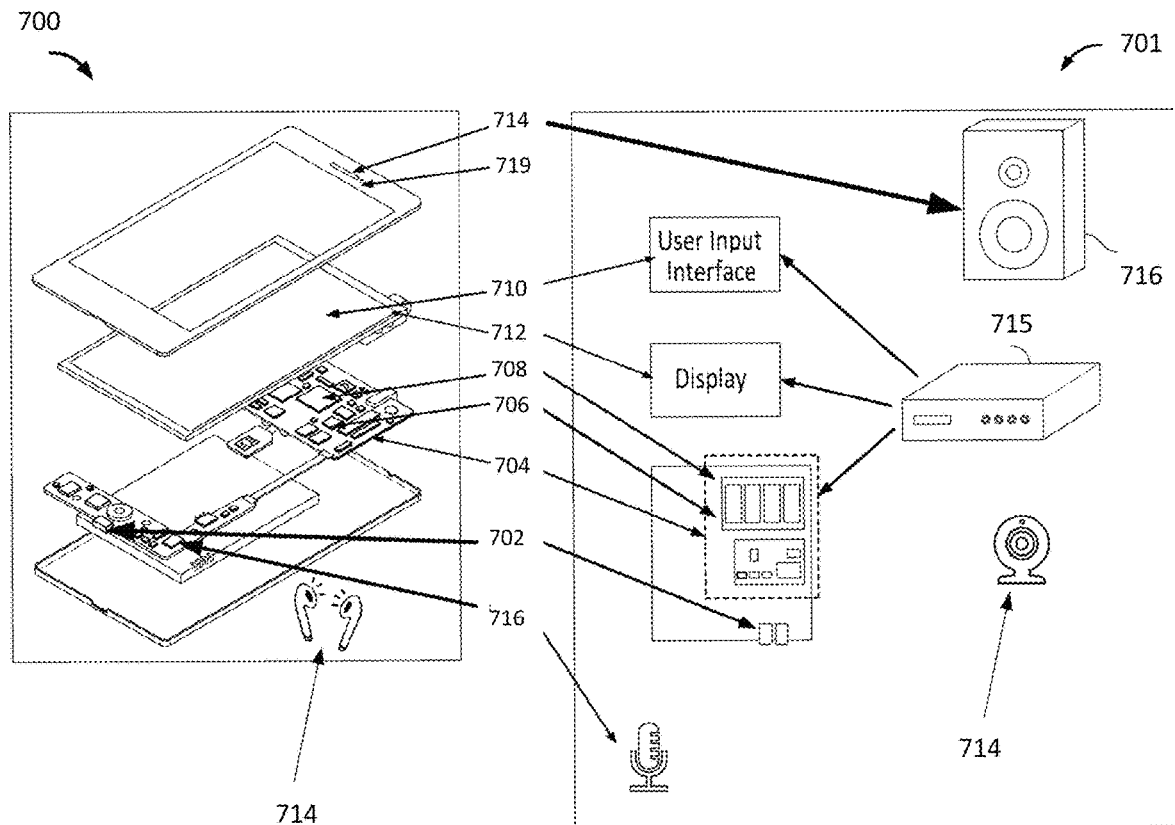
FIG. 7 shows illustrative user equipment devices, in accordance with some embodiments of this disclosure.
Figure 8:
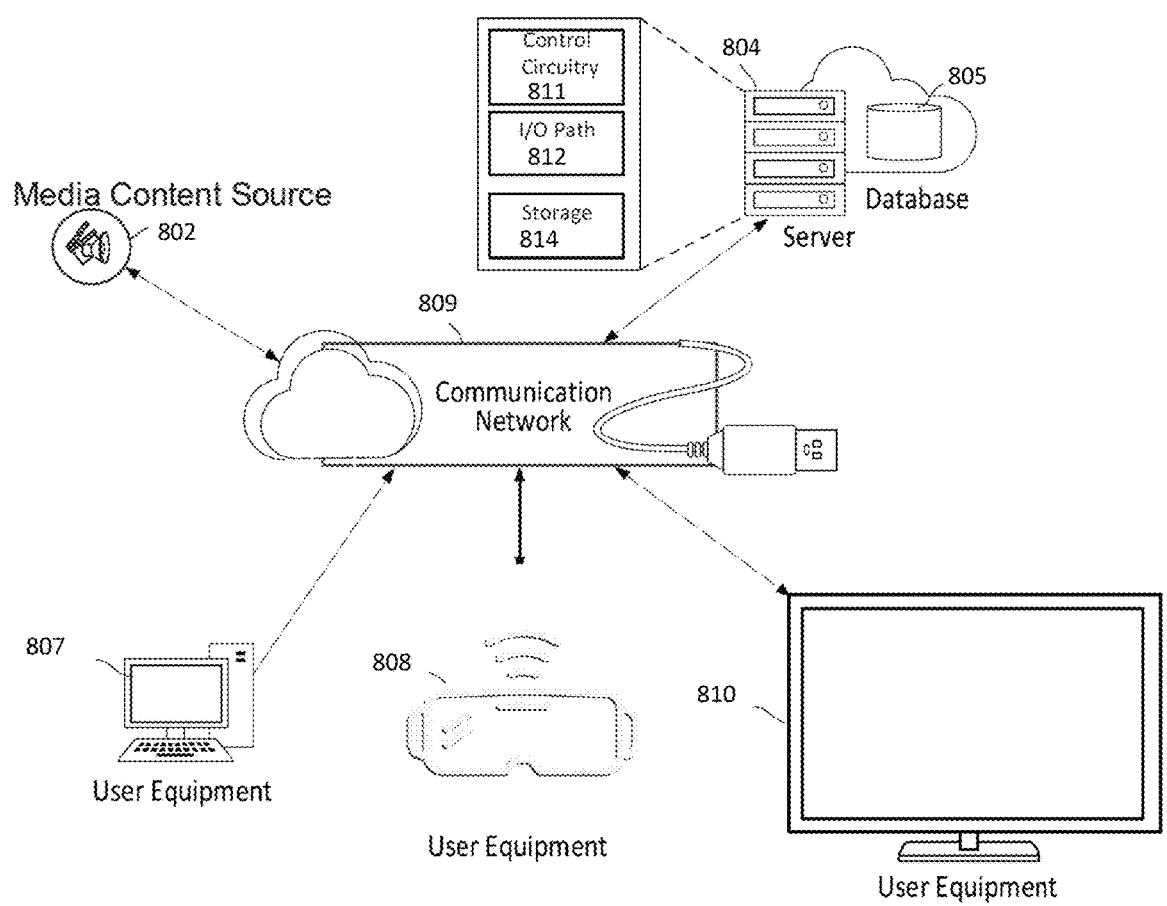
FIG. 8 shows illustrative systems, in accordance with some embodiments of this disclosure.

FIGS. 7-8 describe illustrative devices, systems, servers, and related hardware for an asymmetrical XR application for efficient navigation configured to generate a graphical representation of a real 3D environment, receive a client device input selecting an object, mapping the object to a 3D object in mixed reality, and augmenting the 3D object in mixed reality, in accordance with some embodiments of this disclosure. FIG. 7 shows generalized embodiments of illustrative user devices 700 and 701, which may correspond to, e.g., client user devices and/or XR devices shown in FIGS. 1-6 or any combination thereof. For example, user equipment device 700 may be a smartphone device, a tablet, smart glasses, a virtual reality or augmented reality device, or any other suitable device capable of consuming media assets and capable of transmitting and receiving data over a communication network. In another example, user equipment device 701 may be a user television equipment system or device. User television equipment device 701 may include set-top box 715. Set-top box 715 may be communicatively connected to microphone 716, audio output equipment (e.g., speaker or headphones 714), and display 712. In some embodiments, microphone 716 may receive audio corresponding to a voice of a user, e.g., a voice command. In some embodiments, display 712 may be a television display or a computer display. In some embodiments, set-top box 715 may be communicatively connected to user input interface 710. In some embodiments, user input interface 710 may be a remote-control device. Set-top box 715 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of user equipment devices are discussed below in connection with FIG. 7. In some embodiments, device 700 may comprise any suitable number of sensors, as well as a GPS module (e.g., in communication with one or more servers and/or cell towers and/or satellites) to ascertain a location of device 700.

Each one of user equipment device 700 and user equipment device 701 may receive content and data via input/output (I/O) path 702. I/O path 702 may provide content (e.g., broadcast programming, on-demand programming, Internet content, content available over a local area network (LAN) or wide area network (WAN), and/or other content) and data to control circuitry 704, which may comprise processing circuitry 706 and storage 708. Control circuitry 704 may be used to send and receive commands, requests, and other suitable data using I/O path 702, which may comprise I/O circuitry. I/O path 702 may connect control circuitry 704 (and specifically processing circuitry 706) to one or more communications paths (described below). I/O functions may be provided by one or more of these communications paths, but are shown as a single path in FIG. 7 to avoid overcomplicating the drawing. While set-top box 715 is shown in FIG. 7 for illustration, any suitable computing device having processing circuitry, control circuitry, and storage may be used in accordance with the present disclosure. For example, set-top box 715 may be replaced by, or complemented by, a personal computer (e.g., a notebook, a laptop, a desktop), a smartphone (e.g., device 700), a tablet, a network-based server hosting a user-accessible client device, a non-user-owned device, any other suitable device, or any combination thereof.

Control circuitry 704 may be based on any suitable control circuitry such as processing circuitry 706. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 704 executes instructions for the XR application stored in memory (e.g., storage 708). Specifically, control circuitry 704 may be instructed by the XR application to perform the functions discussed above and below. In some implementations, processing or actions performed by control circuitry 704 may be based on instructions received from the XR application.

In client/server-based embodiments, control circuitry 704 may include communications circuitry suitable for communicating with a server or other networks or servers. The XR application may be a stand-alone application implemented on a device or a server. The XR application may be implemented as software or a set of executable instructions. The instructions for performing any of the embodiments discussed herein of the XR application may be encoded on non-transitory, computer-readable media (e.g., a hard drive, random-access memory on a DRAM integrated circuit, read-only memory on a BLU-RAY disk, etc.). For example, in FIG. 7, the instructions may be stored in storage 708, and executed by control circuitry 704 of a device 700.

In some embodiments, the XR application may be a client/server application where only the client application resides on device 700, and a server application resides on an external server (e.g., server 804 and/or server 816). For example, the XR application may be implemented partially as a client application on control circuitry 704 of device 700 and partially on server 804 as a server application running on control circuitry 811. Server 804 may be a part of a local area network with one or more of devices 700 or may be part of a cloud computing environment accessed via the internet. In a cloud computing environment, various types of computing services for performing searches on the internet or informational databases, providing storage (e.g., for a database) or parsing data are provided by a collection of network-accessible computing and storage resources (e.g., server 804), referred to as "the cloud." Device 700 may be a cloud client that relies on the cloud computing capabilities from server 804 to determine whether processing should be offloaded and facilitate such offloading. When executed by control circuitry 704 or 811, the XR application may instruct control circuitry 704 or 811 circuitry to perform processing tasks for the client device and facilitate a media consumption session integrated with social network services. The client application may instruct control circuitry 704 to determine whether processing should be offloaded.

Control circuitry 704 may include communications circuitry suitable for communicating with a server, social network service, a table or database server, or other networks or servers The instructions for carrying out the above-mentioned functionality may be stored on a server (which is described in more detail in connection with FIG. 7). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 7). In addition, communications circuitry may include circuitry that enables peer-to-peer communication of user equipment devices, or communication of user equipment devices in locations remote from each other (described in more detail below).

Memory may be an electronic storage device provided as storage 708 that is part of control circuitry 704. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 708 may be used to store various types of content described herein as well as XR application data described above. Nonvolatile memory may also be used (e.g., to launch a boot-up routine and other instructions). Cloud-based storage may be used to supplement storage 708 or instead of storage 708.

Control circuitry 704 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 704 may also include scaler circuitry for upconverting and downconverting content into the preferred output format of user equipment 700. Control circuitry 704 may also include digital-to-analog converter circuitry and analog-to-digital converter circuitry for converting between digital and analog signals. The tuning and encoding circuitry may be used by user equipment device 700, 701 to receive and to display, to play, or to record content. The tuning and encoding circuitry may also be used to receive media consumption data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 708 is provided as a separate device from user equipment device 700, the tuning and encoding circuitry (including multiple tuners) may be associated with storage 708.

Control circuitry 704 may receive instruction from a user by way of user input interface 710. User input interface 710 may be any suitable user interface, such as a remote control, mouse, trackball, keypad, keyboard, touchscreen, touchpad, stylus input, joystick, voice recognition interface, or other user input interfaces. Display 712 may be provided as a stand-alone device or integrated with other elements of each one of user equipment device 700 and user equipment device 701. For example, display 712 may be a touchscreen or touch-sensitive display. In such circumstances, user input interface 710 may be integrated with or combined with display 712. In some embodiments, user input interface 710 includes a remote-control device having one or more microphones, buttons, keypads, or any other components configured to receive user input or combinations thereof. For example, user input interface 710 may include a handheld remote-control device having an alphanumeric keypad and option buttons. In a further example, user input interface 710 may include a handheld remote-control device having a microphone and control circuitry configured to receive and identify voice commands and transmit information to set-top box 715.

Audio output equipment 714 may be integrated with or combined with display 712. Display 712 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 712. Audio output equipment 714 may be provided as integrated with other elements of each one of device 700 and equipment 701 or may be stand-alone units. An audio component of videos and other content displayed on display 712 may be played through speakers (or headphones) of audio output equipment 714. In some embodiments, audio may be distributed to a receiver (not shown), which processes and outputs the audio via speakers of audio output equipment 714. In some embodiments, for example, control circuitry 704 is configured to provide audio cues to a user, or other audio feedback to a user, using speakers of audio output equipment 714. There may be a separate microphone 716 or audio output equipment 714 may include a microphone configured to receive audio input such as voice commands or speech. For example, a user may speak letters or words that are received by the microphone and converted to text by control circuitry 704. In a further example, a user may voice commands that are received by a microphone and recognized by control circuitry 704. Camera 718 may be any suitable video camera integrated with the equipment or externally connected. Camera 718 may be a digital camera comprising a charge-coupled device (CCD) and/or a complementary metal-oxide semiconductor (CMOS) image sensor. Camera 718 may be an analog camera that converts to digital images via a video card.

The XR application may be implemented using any suitable architecture. For example, it may be a stand-alone application wholly-implemented on each one of user equipment device 700 and user equipment device 701. In such an approach, instructions of the application may be stored locally (e.g., in storage 708), and data for use by the application is downloaded on a periodic basis (e.g., from an out-of-band feed, from an Internet resource, or using another suitable approach). Control circuitry 704 may retrieve instructions of the application from storage 708 and process the instructions to provide media consumption and social network interaction functionality and generate any of the displays discussed herein. Based on the processed instructions, control circuitry 704 may determine what action to perform when input is received from user input interface 710. For example, movement of a cursor on a display up/down may be indicated by the processed instructions when user input interface 710 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 704 may allow a user to provide user profile information or may automatically compile user profile information. For example, control circuitry 704 may access and monitor network data, video data, audio data, processing data, participation data from a XR application and social network profile. Control circuitry 704 may obtain all or part of other user profiles that are related to a particular user (e.g., via social media networks), and/or obtain information about the user from other sources that control circuitry 704 may access. As a result, a user can be provided with a unified experience across the user's different devices.

In some embodiments, the XR application is a client/server-based application. Data for use by a thick or thin client implemented on each one of user equipment device 700 and user equipment device 701 may be retrieved on-demand by issuing requests to a server remote to each one of user equipment device 700 and user equipment device 701. For example, the remote server may store the instructions for the application in a storage device. The remote server may process the stored instructions using circuitry (e.g., control circuitry 704) and generate the displays discussed above and below. The client device may receive the displays generated by the remote server and may display the content of the displays locally on device 700. This way, the processing of the instructions is performed remotely by the server while the resulting displays (e.g., that may include text, a keyboard, or other visuals) are provided locally on device 700. Device 700 may receive inputs from the user via input interface 710 and transmit those inputs to the remote server for processing and generating the corresponding displays. For example, device 700 may transmit a communication to the remote server indicating that an up/down button was selected via input interface 710. The remote server may process instructions in accordance with that input and generate a display of the application corresponding to the input (e.g., a display that moves a cursor up/down). The generated display may then be transmitted to device 700 for presentation to the user.

In some embodiments, the XR application may be downloaded and interpreted or otherwise run by an interpreter or virtual machine (run by control circuitry 704). In some embodiments, the XR application may be encoded in the ETV Binary Interchange Format (EBIF), received by control circuitry 704 as part of a suitable feed, and interpreted by a user agent running on control circuitry 704. For example, the XR application may be an EBIF application. In some embodiments, the XR application may be defined by a series of JAVA-based files that are received and run by a local virtual machine or other suitable middleware executed by control circuitry 704. In some of such embodiments (e.g., those employing MPEG-2 or other digital media encoding schemes), the XR application may be, for example, encoded and transmitted in an MPEG-2 object carousel with the MPEG audio and video packets of a program.

FIG. 8 is a diagram of an illustrative system 800, in accordance with some embodiments of this disclosure. User equipment devices 807, 808, 810 (e.g., user device and/or XR device in FIGS. 1-6; devices or any other suitable devices, or any combination thereof) may be coupled to communication network 806. Communication network 806 may be one or more networks including the Internet, a mobile phone network, mobile voice or data network (e.g., a 5G, 4G, or LTE network, or any other suitable network or any combination thereof), cable network, public switched telephone network, or other types of communication network or combinations of communication networks. Paths (e.g., depicted as arrows connecting the respective devices to the communication network 806) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 8 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 806.

System 800 may comprise media content source 802, one or more servers 804, and one or more social network services. In some embodiments, the XR application may be executed at one or more of control circuitry 811 of server 804 (and/or control circuitry of user equipment devices 807, 808, 810.

In some embodiments, server 804 may include control circuitry 811 and storage 814 (e.g., RAM, ROM, Hard Disk, Removable Disk, etc.). Instructions for the XR application may be stored in storage 814. In some embodiments, the XR application, via control circuitry, may execute functions outlined in FIGS. 1-6. Storage 814 may store one or more databases. Server 804 may also include an input/output path 812. I/O path 812 may provide media consumption data, social networking data, device information, or other data, over a local area network (LAN) or wide area network (WAN), and/or other content and data to control circuitry 811, which may include processing circuitry, and storage 814. Control circuitry 811 may be used to send and receive commands, requests, and other suitable data using I/O path 812, which may comprise I/O circuitry. I/O path 812 may connect control circuitry 811 (and specifically control circuitry) to one or more communications paths. I/O path 812 may comprise I/O circuitry.

Control circuitry 811 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, control circuitry 811 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 811 executes instructions for an emulation system application stored in memory (e.g., the storage 814). Memory may be an electronic storage device provided as storage 814 that is part of control circuitry 811.

Figure 9:
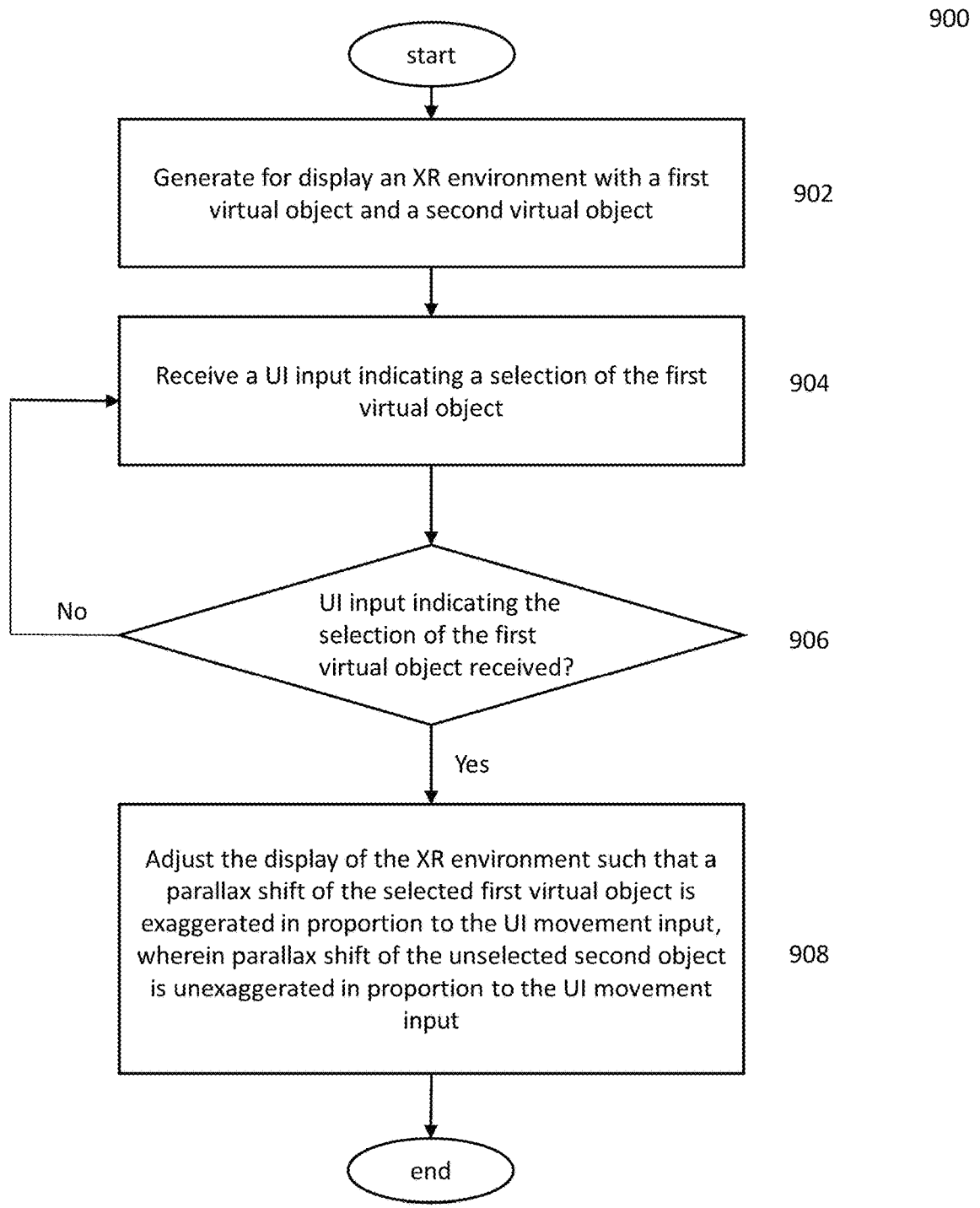
FIG. 9 is a flowchart of a detailed illustrative process for implementing an exaggerated parallax shift for a selected object, in accordance with some embodiments of this disclosure.

FIG. 9 is a flowchart of a detailed illustrative process for implementing an exaggerated parallax shift for a selected object, in accordance with some embodiments of this disclosure. In various embodiments, the individual steps of process 900 may be implemented by one or more components of the devices and systems of FIGS. 1-8. Although the present disclosure may describe certain steps of process 900 (and of other processes described herein) as being implemented by certain components of the devices and systems of FIGS. 1-8, this is for purposes of illustration only, and it should be understood that other components of the devices and systems of FIGS. 1-8 may implement those steps instead.

At 902, the XR application, via the control circuitry 811, generates for display an extended reality (XR) environment, wherein the XR environment comprises a first virtual object and a second virtual object. In some embodiments, the XR application may generate the environment on a device 700 (e.g., a VR headset, smartphone, laptop, personal computer, wearable device, etc.). At 904, the XR application, via the control circuitry 811, receives a UI selection input (e.g., via touchscreen, keyboard, voice, gesture, instruction, code, eye gaze, etc.), indicating a selection of the first virtual object. If the XR application determines, at 906, that the UI selection input indicates a selection of the first virtual object, then processing may proceed to 908. If the XR application determines at 906, UI selection input does not indicate a selection of the first virtual object, then processing reverts to 904. At 908, the XR application, via control circuitry 811, adjusts the display (e.g., via networking, Bluetooth, internal bus, wireless communication, wired communication, or any suitable digital communication medium thereof) of the XR environment such that a parallax shift of the selected first virtual object is exaggerated in proportion to the UI movement input, wherein parallax shift of the unselected second object is unexaggerated in proportion to the UI movement input.

Figure 10:
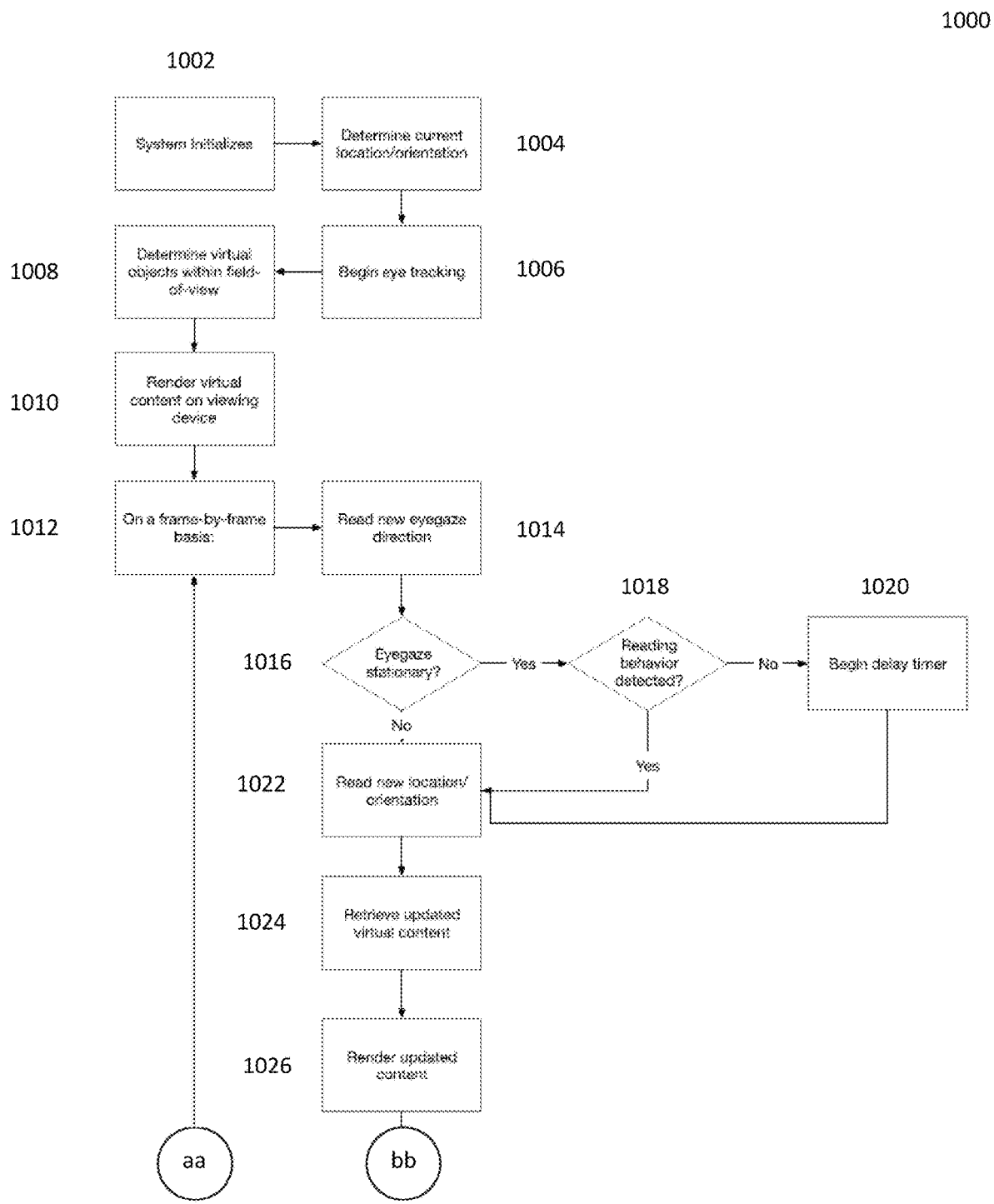
FIG. 10 is a flowchart of a detailed illustrative process for object selection by receiving an eye gaze vector, in accordance with some embodiments of this disclosure.
Figure 10:
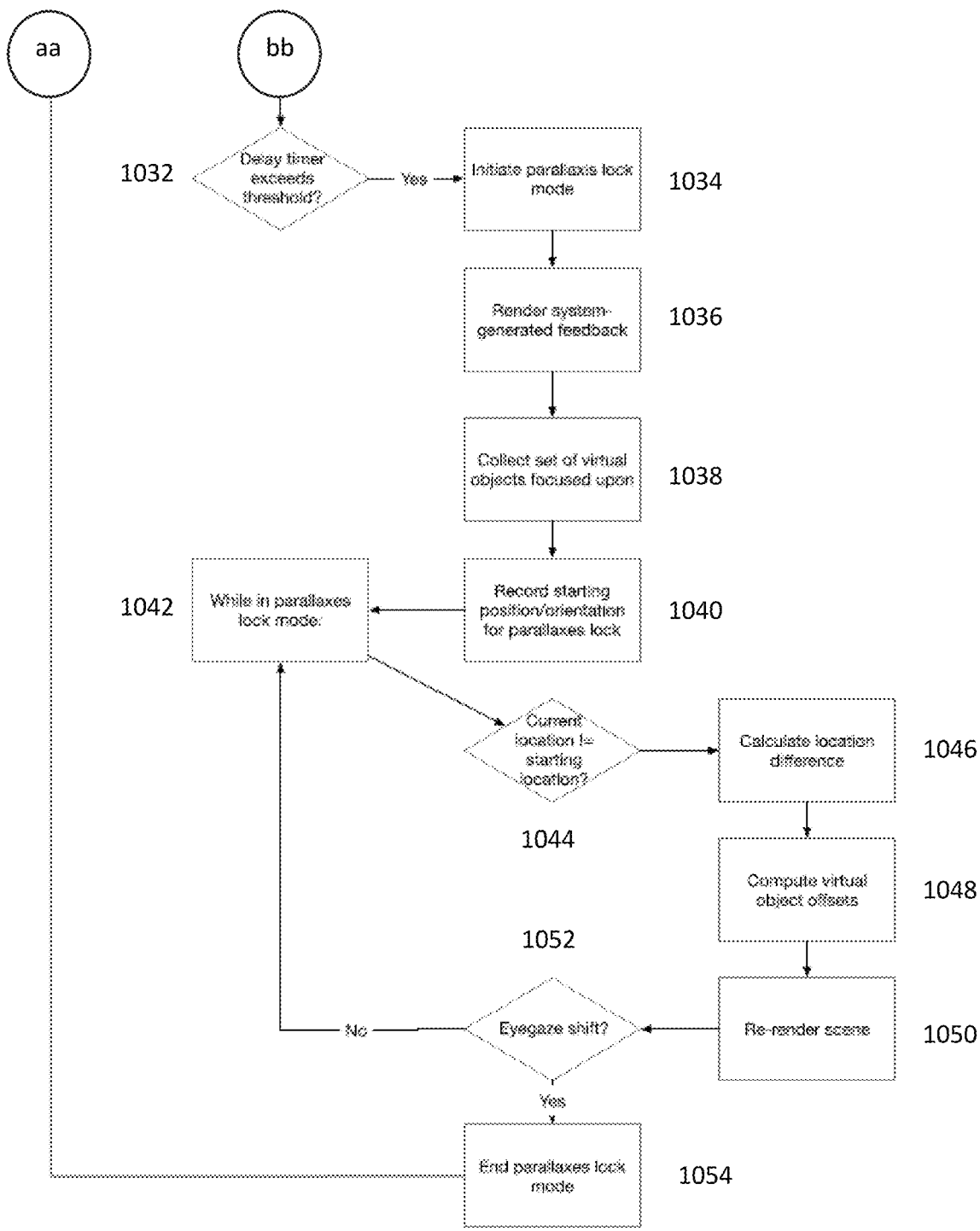

FIG. 10 is a flowchart of a detailed illustrative process 1000 for object selection by receiving an eye gaze vector, in accordance with some embodiments of this disclosure. At 1002, the XR application, via control circuitry 811, initializes the system (e.g., via networking, Bluetooth, internal bus, wireless communication, wired communication, or any suitable digital communication medium thereof). At 1004, the XR application, via control circuitry 811 and I/O path 812, then determines current location/orientation of eye position of a viewer by receiving an eye gaze vector. At 1006, the XR application, via control circuitry 811, begins eye tracking utilizing the eye gaze vectors. At 1008, the XR application, via control circuitry 811, determines virtual objects within a field of view. At 1010, the XR application, via control circuitry 811 and I/O path 812, renders one or more objects with an XR environment (e.g., on device 700—for example an AR headset). At 1012, the XR application, via control circuitry 811, on a frame-by-frame basis, determines the eye gaze vector 1014. At 1016, the XR application, via control circuitry 811, determines whether the eye gaze vector is stationary. If the XR application determines, at 1016, that the eye gaze is stationary, then processing proceeds to 1018. At 1018, the XR application determines, via control circuitry 811, whether reading behavior is detected via a temporal threshold. If the XR application determines, via control circuitry 811, that reading behavior is detected, then processing advances to 1020, where a delay timer is initiated via control circuitry 811, after which processing advances to 1022. If the XR application determines, via control circuitry 811, that reading behavior is not detected, then processing advances to 1022 (without the delay timer). At 1022, the XR application, via control circuitry 811, determines a new eye gaze vector. At 1024, the XR application, via I/O path 812, retrieves updated XR environment content, and using control circuitry 811 renders the updated content 1026.

At 1032, the XR application determines, via control circuitry 811, whether the delay time exceeds a temporal threshold. If so, the XR application, at 1034, initiates, via control circuitry 811, an object selection (e.g., locking). At 1036, the XR application, via control circuitry 811, renders the system-generated feedback. At 1038, the XR application, via control circuitry 811, collects the selected set of virtual objects. At 1040, the XR application, via control circuitry 811, records the position for the selected virtual objects. At 1042, upon selection of the objects, the XR application at 1044 determines whether the current location is equivalent to the starting location. If the current location is not equivalent to the starting location, at 1046, the XR application, via control circuitry 811, calculates a location difference and computes 1048 a virtual object offset and updates the generation for display the XR environment at 1050. At 1052, the XR application determines, via control circuitry 811, whether the eye gaze vector has shifted. If not, the XR application reverts to step 1042. If the XR application determines that the eye gaze vector has shifted, then the selected object is deselected 1054 and processing reverts to step 1012.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   generating for display an extended reality (XR) environment for consumption by a viewer, wherein the XR environment comprises a first virtual object and a second virtual object;
   receiving a user-interface (UI) selection input indicating a selection of the first virtual object; and
   in response to receiving a UI movement input:
   adjusting the display of the XR environment such that:
   the unselected second virtual object is moved in the XR environment with an unexaggerated parallax shift, wherein the movement of the unselected second virtual object is based at least part on: (a) magnitude of the UI movement input, and (b) a first proportion selected based on a first distance of the unselected second virtual object from the viewer; and the selected first virtual object is moved in the XR environment with an exaggerated parallax shift, wherein the movement of the selected first virtual object is based at least part on (a) the magnitude of the UI movement input, (b) a second proportion selected based on a second distance of the selected first virtual object from the viewer, and (c) an additional exaggeration scaling factor that is not applied to the movement of the unselected second virtual object.

2. The method of claim 1, wherein receiving the UI selection input indicating the selection of the first virtual object, further comprising:

determining an eye gaze vector in the XR environment, wherein the eye gaze vector is based on a user's eye position; and determining whether at least one of the first virtual object or the second virtual object intersects the eye gaze vector.

3. The method of claim 1, further comprising:

receiving a UI fixing input to fix the first virtual object to a position in the XR environment;

in response to receiving additional UI movement input:
adjusting the display of the XR environment, such that the first virtual object remains fixed to the position in the XR environment; and in response to receiving another UI movement input, adjusting the display of the XR environment such that the first virtual object remains fixed to the position in the XR environment.

4. The method of claim 1, wherein the adjusting the display of the XR environment further comprises:

generating for display a phantom outline of the selected first virtual object at a location prior to the exaggerated parallax shift of the selected first virtual object.

5. The method of claim 1, wherein the receiving the UI selection input indicating the selection of the first virtual object comprises receiving at least one of: a gesture input, eye gaze tracking input, voice command input, typed input, or an input defining a selection of an area of the XR environment.

6. The method of claim 1, wherein the receiving the UI selection input indicating the selection of the first virtual object comprises:

receiving a wink gesture; and identifying direction of eye gaze proximate to the first virtual object during the wink gesture.

7. The method of claim 1, wherein the receiving the UI selection input indicating the selection of the first virtual object, further comprises:

receiving an eye gaze directed proximate to the first virtual object;

determining whether movement of the eye gaze exceeds a reading avoidance temporal threshold; and in response to the eye gaze exceeding the reading avoidance temporal threshold, confirming the selection of the first virtual object.

8. The method of claim 1, wherein receiving the UI selection input indicating the selection of the first virtual object, further comprising receiving a spatial area selection via a drawn polygon within the XR environment.

9. The method of claim 1, further comprising:

adjusting the display of the XR environment such that a third virtual object is moved in the XR environment with an exaggerated parallax shift, wherein the third virtual object is obscured by the unselected second virtual object.

10. The method of claim 9, wherein the exaggerated parallax shift of the third virtual object is exaggerated less than the first virtual object.

11. A system comprising:

control circuitry configured to:
generate for display an extended reality (XR) environment for consumption by a viewer, wherein the XR environment comprises a first virtual object and a second virtual object;

I/O circuitry configured to:
receive a user-interface (UI) selection input indicating a selection of the first virtual object; and wherein the control circuitry is further configured, in response to receiving a UI movement input, to:
adjust the display of the XR environment such that:
the unselected second virtual object is moved in the XR environment with an unexaggerated parallax shift, wherein the movement of the unselected second virtual object is based at least part on: (a) magnitude of the UI movement input, and (b) a first proportion selected based on a first distance of the unselected second virtual object from the viewer; and the selected first virtual object is moved in the XR environment with an exaggerated parallax shift, wherein the movement of the selected first virtual object is based at least part on (a) the magnitude of the UI movement input, (b) a second proportion selected based on a second distance of the selected first virtual object from the viewer, and (c) an additional exaggeration scaling factor that is not applied to the movement of the unselected second virtual object.

12. The system of claim 11, wherein the system is further configured to receive the UI selection input indicating the selection of the first virtual object by:

determining an eye gaze vector in the XR environment, wherein the eye gaze vector is based on a user's eye position; and determining whether at least one of the first virtual object or the second virtual object intersects the eye gaze vector.

13. The system of claim 11, wherein the control circuitry is further configured to:

receive a UI fixing input to fix the first virtual object to a position in the XR environment;

in response to receiving additional UI movement input:
adjust the display of the XR environment, such that the first virtual object remains fixed to the position in the XR environment; and in response to receiving another UI movement input, adjust the display of the XR environment such that the first virtual object remains fixed to the position in the XR environment.

14. The system of claim 11, wherein the system is further configured to adjust the display of the XR environment by:

generating for display a phantom outline of the first virtual object at a location prior to the exaggerated parallax shift of the selected first virtual object.

15. The system of claim 11, wherein the receiving the UI selection input indicating the selection of the first virtual object comprises receiving at least one of: a gesture input, eye gaze tracking input, voice command input, typed input, or an input defining a selection of an area of the XR environment.

16. The system of claim 11, wherein the system is further configured to receive the UI selection input indicating the selection of the first virtual object by:

receiving a wink gesture; and identifying direction of eye gaze proximate to the first virtual object during the wink gesture.

17. The system of claim 11, wherein the system is further configured to receive the UI selection input indicating the selection of the first virtual object by:

receiving an eye gaze directed proximate to the first virtual object;

determining whether movement of the eye gaze exceeds a reading avoidance temporal threshold; and in response to the eye gaze exceeding the reading avoidance temporal threshold, confirming the selection of the first virtual object.

18. The system of claim 11, wherein the system is further configured to receive the UI selection input indicating the selection of the first virtual object by receiving a spatial area selection via a drawn polygon within the XR environment.

19. The system of claim 11, wherein the control circuitry is further configured to:

adjust the display of the XR environment such that a third virtual object is moved in the XR environment with an exaggerated parallax shift, wherein the third virtual object is obscured by the unselected second virtual object.

20. The system of claim 19, wherein the exaggerated parallax shift of the third virtual object is exaggerated less than the first virtual object.

\* \* \* \* \*